Patented Feb. 17, 1942

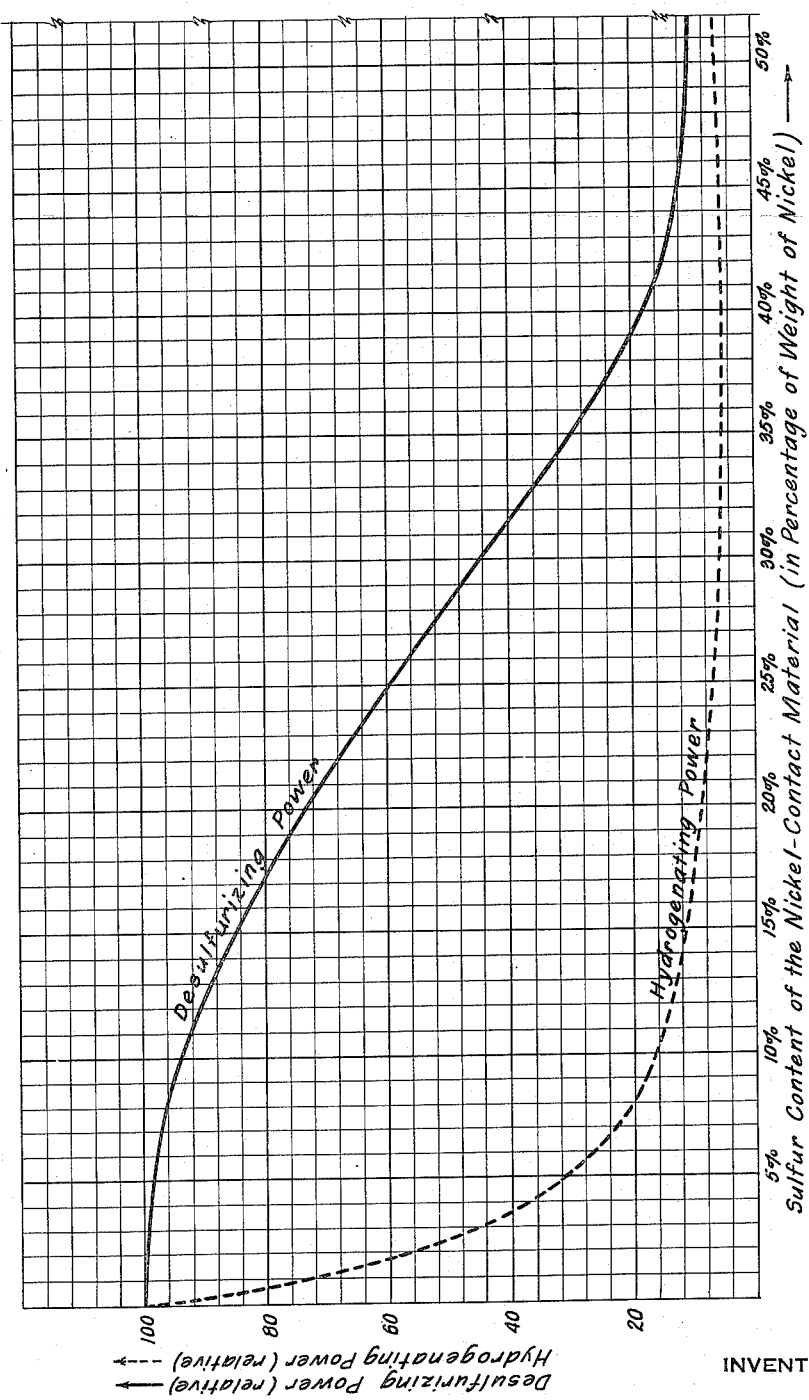

2,273,297

UNITED STATES PATENT OFFICE 2,273,297

SULPHUR ABSORBENT AND METHOD OF REGENERATING

Antoni Szayna, Brooklyn, N. Y., assignor to Albert C. Travis, New York, N. Y.

Application December 24, 1936, Serial No. 117,673

7 Claims. (Cl. 252—189)

My invention relates to a contact material and a method for making and regenerating the same, and more particularly as pertains to a desulphurized contact material for use in a process of desulphurizing hydrocarbons. In certain desulphurizing methods, distillates containing sulphur and sulphur compounds are desulphurized by contacting the same with desulphurizing contact materials at temperatures below active pyrolytic decomposition temperatures. The desulphurization products are sweet, free of hydrogen sulphide, mercaptans and elementary sulphur, and generally of low sulphur and gum content. The contact material absorbs the sulphur and sulphur compounds and finally becomes "poisoned" to such extent that the limit of sulphur adsorption or absorption for the contact material is reached and the contact materials will no longer be able to perform their function of removing sulphur and sulphur compounds.

The active element of the contact material is a metal such as nickel, cobalt, iron, or copper, or oxides of such metals, or any of them, or combinations of metals or oxides, or combinations of these metals and their oxides.

These contact agents or catalysts would normally have a high hydrogenating power. In the treatment of hydrocarbon distillates and particularly those intended for use as a motor fuel, hydrogenation results in the conversion of aromatic hydrocarbons into saturated hydrocarbons. This is undesirable since the aromatic hydrocarbons impart to a motor fuel antiknock properties. Some of the diolefines and a portion of the olefines tend to form gum in a hydrocarbon distillate so that the controlled hydrogenation of these compounds is desirable, leaving the aromatic hydrocarbons and the major proportion of the olefines untouched.

One object of my invention is to provide a contact material for desulphurizing hydrocarbons without hydrogenating the same to a deleterious extent.

Another object of my invention is to provide a method of producing a contact material for desulphurizing hydrocarbons but of relatively low hydrogenating power.

Another object of my invention is to provide a method for regenerating my contact material in such a manner that it will be able to desulphurize hydrocarbons without excessive hydrogenation of the same.

Another object of my invention is to provide a contact material and a method of regenerating the same which will permit the desired treatment of hydrocarbons at high temperatures substantially without decomposition and deposition of carbon.

Other and further objects of my invention will appear from the following description.

The accompanying drawing which forms part of the instant specification and which is to be read in conjunction therewith, shows curves of desulphurizing and hydrogenating power, plotted against sulphur content in contact material of a class comprising nickel, cobalt, iron, copper and their oxides. The curve is diagrammatic and represents only the trend of results obtained especially with nickel contact material.

In general, my invention contemplates the impregnation of an inert refractory carrying material such as porous porcelain, pumice, bauxite, silica gel, or the like, with nickel, cobalt, iron, or copper, or mixtures of the same or their oxides, either alone or with promoters such as refractory oxides of aluminum, magnesium, chromium or calcium. If desired, small amounts of alkalies, such as sodium hydroxide, potassium carbonate or water glass may be added. The contact material is prepared in such a manner that its desulphurizing power is substantially maintained, while its catalytic power is reduced.

More particularly, an inert material which will hereinafter be referred to as a carrier such as pumice, unglazed porcelain, silica, carborundum, bauxite, silica gel, and the like is imbibed with a salt or mixtures of salts of the metals nickel, cobalt, iron or copper. For convenience, the contact material and method of preparing the same will be described with reference to nickel, though it is to be understood that any of these metals may be employed for the contact metal. The promoter renders the contact material more active and gives it increased longevity. As promoters, I may employ an oxide or oxides of aluminum, chromium, magnesium or calcium or the like. Accordingly, the carrier may be imbibed or saturated with nickel and aluminum salts. One method is to melt crystalline nickel nitrate $(Ni(NO_3)_2.6H_2O)$ and crystalline aluminum nitrate $(Al(NO_3)_3.9H_2O)$. Crystalline nickel nitrate melts at 56.7° C. while crystalline aluminum nitrate melts at 73° C. Heating the mixture of crystalline nickel nitrate and crystalline aluminum nitrate to temperatures between 70° C. and 125° C. will give a molten mass of the two nitrates. The inert carrying material may be stirred, while maintaining the temperature, into the molten mass and thus imbibe it with a mixture of the two nitrates. The thus imbibed material may be roasted alone or in a stream of air or in a stream of inert gas such as nitrogen or carbon dioxide to decompose the nitrates into metallic oxides and nitrogen oxides, a possibly typical reaction product obtained being as follows:

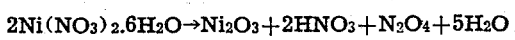

$$2Ni(NO_3)_2.6H_2O \rightarrow Ni_2O_3 + 2HNO_3 + N_2O_4 + 5H_2O$$

This decomposition should be done in closed vessels, resistant to acid vapors, as for example vessels of aluminum or special steels such as silicon steel, since the vapors of nitric acid are corrosive. The conversion of the nitrates into oxides may be accompanied by stirring and provision may be made for the recovery of the nitric acid and nitrogen oxides.

The temperature of this decomposition will take place between 150° C. and 370° C. It is not desirable that the temperature should exceed 485° C. The resulting contact material obtained will be of dark grayish appearance; presumably it is a mixture of different oxides, disseminated through the carrier. It is difficult to analyze accurately the resulting material and we presume that it is a mixture of green mono-oxide ($NiO_2$) and the dark higher oxides like sesquioxide ($Ni_2O_3$), nickelic oxide ($Ni_3O_4$). In general, if the surface of the material has a glazed appearance the temperature has been allowed to rise too high. As a matter of precaution, it is wise to sprinkle the contact material when ready for the first desulphurizing operation with small amounts of ammonia in order to prevent possible corrosion of the treating vessels in subsequent processing.

Another method of preparing the contact material is to use a salt which does not melt as easily as crystalline nickel nitrate. For example, anhydrous nickel sulphate ($NiSO_4$) does not melt easily. At 840° C. it will melt with decomposition, giving off sulphur trioxide. Nickel sulphate, however, is readily soluble in water. A carrier may be imbibed in an aqueous solution of nickel sulphate and dried. The dry carrier may be again saturated and re-dried and this process may be repeated until a sufficient quantity of nickel sulphate has been disseminated through the carrier. The nickel sulphate impregnated carrier may then be roasted alone or in a stream of air at temperatures in excess of 840° C., to decompose the sulphate, sulphur trioxide being given off and nickel oxide remaining. The nickel sulphate also may be reduced in a stream of hydrogen to the sulphide and then the sulphide roasted in a stream of air or oxygen, together with steam, as in the regeneration method, as will be hereinafter more fully described. The reaction in this case is:

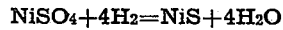
$$NiSO_4 + 4H_2 = NiS + 4H_2O$$

If desired, the nickel sulphate impregnated carrier may be treated with a solution of sodium carbonate (soda ash), forming the green carbonate of nickel as follows:

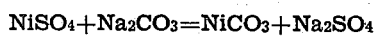
$$NiSO_4 + Na_2CO_3 = NiCO_3 + Na_2SO_4$$

This last method would be the least desirable since it produces a contact material having an undesirably high hydrogenating activity, but may be employed if treated so as to leave the material slightly poisoned with sulphur, as will be hereinafter more fully pointed out. The aluminum promoters may be deposited on a carrier either simultaneously with the nickel salt or they may be applied in solution after the nickel salt has been transformed to the oxide.

Water glass or alkalies may be used to impregnate the carrier or the contact since it appears that the nickel will adhere better to the carrier if impregnation with one per cent of sodium hydroxide is practiced. The percentage of nickel to the carrier may vary from 3 to 30 per cent in terms of metallic nickel, depending upon the conditions of desulphurizing operation. The contact time necessary to obtain desired desulphurizing will depend among other factors upon the following; the volume of the carrier material used and the concentration or amount of contact upon the carrier. Likewise the frequency of regeneration is dependent upon the same factors and the quantity of vapors being treated. A contact too highly imbibed, however, is not as economically efficient per weight of nickel as those having lower degrees of impregnation.

Before the contact material can be employed, it should be activated, that is, nickel oxide should be reduced to the metallic state by reduction with hydrogen as follows:

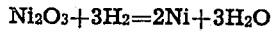
$$Ni_2O_3 + 3H_2 = 2Ni + 3H_2O$$

The activating or reducing reaction is preferably carried out at temperatures between 315° C. and 425° C. This temperature of reduction is critical and constitutes a salient feature of my invention. The object of my invention is to obtain a contact material which will be of reduced catalytic activity, while of comparatively high desulphurizing activity. Metallic contact materials of the character described, namely nickel, cobalt and iron reduced at temperatures between 150° and 260° C. are of high catalytic activity, unless such activity is controlled, e. g. by partial poisoning. The upper limit of temperature, at which reduction may take place is approximately 550° C., but the use of such high temperatures is of course limited by the effect of high temperature on contact material. The activating or reducing reaction can also be combined in one operation with actual desulphurizing of the hydrocarbon vapors, because of the fact that they carry also an admixture of free hydrogen.

When my contact material is used in a desulphurizing operation, it absorbs sulphur probably due to a reaction forming the sulphide of the metal. After this reaction has proceeded for a period of time, the contact material becomes inactive and should be regenerated. I accomplish this regeneration by passing air at temperatures between 250° C. and 550° C., preferably at about 400° C., through a bed of the contact material, oxidizing both nickel to nickel oxides and sulphur to sulphur oxides in reactions such as:

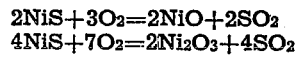
$$2NiS + 3O_2 = 2NiO + 2SO_2$$
$$4NiS + 7O_2 = 2Ni_2O_3 + 4SO_2$$

It may be possible that the nickel sulphide is oxidized to nickel sulphite or nickel sulphate, and the high temperature splits these compounds into nickel oxide or nickel sesquioxide and sulphur oxides. It should be understood, however, that these suggested reactions are offered only as an attempted explanation of the observed process of regeneration, but that my invention is in no way dependent upon such explanation.

Any tarry and carbonaceous materials which have been deposited on the nickel during desulphurization, are oxidized, during the regeneration process, to carbon dioxide and water. At a temperature of 300° C. the development of sulphur dioxide is noticeable but is slow. When regeneration takes place between temperatures of 300° C. and 550° C., preferably between 400° C. and 450° C., the regenerating contact material may have grains of different colors. The majority of them are dark gray but there are also lighter colored grains of light grayish and light greenish color. There are, too, black grains. These grains probably represent different oxides of nickel, nickel mono-oxide being green, nickel sesquioxide being gray, and nickelic oxide being black.

The regeneration or oxidizing reactions are exothermic and tend to raise the temperature over that at which it is desired to conduct the regeneration. Unless some method of control is resorted to, I have found that temperatures in excess of 540° C. have been reached. These temperatures, as hereinbefore pointed out, may be too high for proper regeneration. In order to keep the temperature from rising beyond the desired point, as for example, 450° C., the oxygen bearing gas may be diluted with an inert gas such as carbon dioxide, nitrogen or, more especially, steam. The introduction of the tempering gas or medium may be controlled by the temperature in the regenerating zone.

If the regeneration is carried out to its ultimate conclusion, substantially all of the sulphur will be freed from the contact material. I have discovered that a slightly "poisoned" contact material containing a small percentage of sulphur, for example two per cent of sulphur based on the weight of nickel, will still possess good desulphurizing properties and will have its catalytic activity reduced, which is to be desired. The amount of sulphur remaining in the contact material may vary, depending upon the hydrocarbon stocks to be treated in a desulphurizing operation, from one half to twenty per cent of the weight of the contact material. A slightly poisoned contact material will act as a satisfactory desulphurizing agent. Due to the fact that the slight poisoning of the contact material inhibits its catalytic properties, I am able to treat a motor fuel containing aromatics without the danger of hydrogenating the aromatics to destroy the antiknock properties of the motor fuel. At the same time, it is desirable to hydrogenate the diolefines which are the gum forming compounds and these may be hydrogenated without appreciably decreasing the antiknock quality of the motor fuel with my slightly poisoned catalyst. Due further to the fact that the catalytic property of the contact is reduced by the presence of sulphur, a saving in hydrogen in the subsequent desulphurizing process which would otherwise be lost by saturating unsaturated hydrocarbons, is effected. The accompanying drawing will clearly illustrate the effect of the presence of residual sulphur in the contact material.

Contact metals of the class nickel, cobalt, and iron, possess the property at the temperatures in which the desulphurizing process operates, that is at temperatures between 370° C. and 455° C. of promoting decomposition of hydrocarbons into the elements carbon and hydrogen. I have discovered that these metals slightly "poisoned" with sulphur do not possess this harmful property of causing decomposition of the hydrocarbon into its elements.

After regeneration of the contact material, that is, the oxidizing of the sulphur compounds and the accompanying oxidation of nickel to nickel oxides, the contact material is again reactivated with hydrogen as hereinbefore pointed out.

It will be observed that I provide a nickel contact material in a special state of activity in which the contact material has pronounced ability for sulphur absorption and for the general treatment of hydrocarbons boiling within the motor fuel range to improve the properties of the treated stocks, while at the same time having a low hydrogenating activity. It will be further observed that I have accomplished the objects of my invention. I have provided a contact material which will remove sulphur and gum forming compounds when employed in accordance with certain desulphurizing operations, which contact material further may be regenerated, reactivated, and again reused. The special state of activity results from the presence of small amounts of sulphur, that is from the use of a slightly "poisoned" contact material and from the further fact that the activation is conducted at a temperature above 200° C., preferably between 200° C. and 510° C., the upper limit of temperature of activation being that at which a serious reduction of the desulphurizing activity begins to be effected.

In the following table, contact materials previously used were regenerated to a point containing about two per cent of sulphur with respect to the nickel. The contact materials contained ten per cent by weight of nickel. The distillates or raw stocks of high sulphur content were treated and a pressure of 200 pounds per square inch was employed.

Contact: 10% nickel and 1% $Al_2O_3$ on pumice stone, several times used in previous runs with around 2% sulphur referred to nickel left after each regeneration.

| Regeneration medium | Air and steam | Air and steam. |
|---|---|---|
| Regeneration temperature | 700°-800° F | 700°-810° F. |
| Reduction medium | Hydrogen | Hydrogen of 85% purity. |
| Reduction temperature | 450°-800° F | 400°-780° F. |

*Desulphurization run*

| | California cracked distillate | Coal tar light crude oil |
|---|---|---|
| Raw stock: | | |
| Gravity A. P. I. at 60° F | 57.7° | |
| Color | Brown | Yellow. |
| Doctor | Sour | Sour. |
| Sulphur | 1.15% | 0.96%. |
| Corrosion | Corrosive | Corrosive. |
| Initial boiling point | 106° F | 151° F. |
| 50% boiling point | 268° F | 203° F. |
| End boiling point | 428° F | 390° F. |
| Temperature | 750°-840° F | 760°-835° F. |
| Pressure | 200 lbs. sq. in | 200 lbs. sq. in. |
| Percent hydrogen by weight introduced | 1.3% | 1.6%. |
| Percent hydrogen by weight absorbed | 0.3% | 0.4%. |
| Product: | | |
| Gravity A. P. I. at 60° F | 58.2° | |
| Sulphur | 0.050% | 0.081%. |
| Corrosion | Not corrosive | Not corrosive. |
| End boiling point | 427° F | 390° F. |

These products when acid and caustic washed (¼ to ½ lb. of acid per barrel) give a final product of good color and gum stability, and also of very high tetra-ethyl-lead susceptibility.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A regenerated sulphur absorbing mass for use in desulphurizing of hydrocarbon vapors at temperatures above about 700° F. in the presence of hydrogen, which comprises a porous inert refractory carrier material, metal of the class consisting of nickel, cobalt and iron, at least a part of which is present as free metal distributed on the surfaces of said carrier in an extended surface condition which makes it highly reactive with sulphur compounds and which would in the absence of sulphur make it highly active as a catalyst for hydrogenation and decomposition of hydrocarbons into elements at temperatures above 700° F.; and sulphur present in all parts of the mass in amount greater than one-half percent based on the weight of said metal, whereby to reduce substantially the hydrogenation activity and the capacity for said catalytic decomposition of hydrocarbons at temperature above 700° F., but the total amount of such sulphur being substantially less than sufficient to exhaust the sulphur-absorbing capacity of said mass, and the surface of said metal being free of carbon and organic deposits.

2. A regenerated sulphur absorbing mass for use in desulphurizing of hydrocarbon vapors at temperatures above about 700° F. in the presence of hydrogen, which comprises a porous inert refractory carrier material, metal of the class consisting of nickel, cobalt and iron, at least a part of which is present as free metal distributed on the surfaces of said carrier in an extended surface condition which makes it highly reactive with sulphur compounds and which would in the absence of sulphur make it highly active as a catalyst for hydrogenation and decomposition of hydrocarbons into elements at temperatures above 700° F.; and sulphur present in all parts of the mass in amount sufficient to reduce substantially the hydrogenation activity and to substantially eliminate the capacity for said catalytic decomposition of hydrocarbons at temperature up to about 850° F., but the total amount of such sulphur being substantially less than sufficient to exhaust the sulphur-absorbing capacity of said mass, and the surface of said metal being free of carbon and organic deposits.

3. A regenerated sulphur absorbing mass for use in desulphurizing of hydrocarbon vapors at temperatures above about 700° F. in the presence of hydrogen, which comprises a porous inert refractory carrier material, metal of the class consisting of nickel, cobalt and iron, at least a part of which is present as free metal distributed on the surfaces of said carrier in an extended surface condition which makes it highly reactive with sulphur compounds and which would in the absence of sulphur make it highly active as a catalyst for hydrogenation and decomposition of hydrocarbons into elements at temperatures above 700° F.; and sulphur present in all parts of the mass in amount between two and twenty percent based on the weight of said metal, whereby to reduce substantially the hydrogenation activity and the capacity for said catalytic decomposition of hydrocarbons at temperature above 700° F., and the surface of said metal being free of carbon and organic deposits.

4. The method of regenerating a sulphur-absorbing contact material from a sulphided contact mass comprising a porous refractory carrier material and a metal of the class consisting of nickel, cobalt and iron distributed on said carrier material in an extended surface condition, which comprises passing an oxygen containing gas into said contact mass while the parts of said mass which are to be regenerated are at temperatures above 300° C., and below 550° C., whereby to remove sulphur from said mass; preventing the mass from heating at any point to a temperature above 550° C. by diluting the oxygen supplied to the mass with other gas adapted to take up and carry off, as formed, heat produced by oxidation; and terminating the sulphur removing reaction in each part of the mass while said metal therein retains at least one-half percent of sulphur, based on the weight of said metal.

5. The method of regenerating a sulphur-absorbing contact material from a sulphided contact mass comprising a porous refractory carrier material and a metal of the class consisting of nickel, cobalt and iron distributed on said carrier material in an extended surface condition, which comprises passing an oxygen containing gas into said contact mass while the parts of said mass which are to be regenerated are at temperatures above 300° C., and below 550° C., whereby to remove sulphur from said mass; preventing the mass from heating at any point to a temperature above 550° C., by diluting the oxygen supplied to the mass with steam, adapted to take up and carry off, as formed, heat produced by oxidation; and terminating the sulphur removing reaction in each part of the mass while said metal therein retains at least one-half percent of sulphur, based on the weight of said metal.

6. The method of regenerating a sulphur-absorbing contact material from a sulphided contact mass comprising a porous refractory carrier material and a metal of the class consisting of nickel, cobalt and iron distributed on said carrier material in an extended surface condition, which comprises passing an oxygen containing gas into said contact mass while the parts of said mass which are to be regenerated are at temperatures above 300° C., and below 550° C., whereby to remove sulphur from said mass; preventing the mass from heating at any point to a temperature above 550° C. by diluting the oxygen supplied to the mass with other gas adapted to take up and carry off, as formed, heat produced by oxidation; terminating the sulphur removing reaction in each part of the mass while said metal therein retains at least one-half percent of sulphur, based on the weight of said metal; and thereafter reducing the resulting oxide to free metal by treatment with hydrogen at temperatures below 510° C.

7. The method of regenerating a sulphur absorbing contact material from a sulphided contact mass comprising an inert refractory material impregnated with a metal selected from the class consisting of nickel, cobalt, and iron, which comprises the steps of subjecting the sulphided contact material to the action of an oxygen bearing gas at temperatures between 300° C. and 550° C., and stopping said regeneration reaction in each part of the mass when the sulphur content of the sulphided contact material is substantially reduced but while all parts thereof retain at least one-half of one percent to fifteen percent by weight, based on the metal of said class, whether free or combined, and subsequently reducing the resultant product under conditions adapted to reduce oxide of said metal to metal but to avoid reduction of its sulphur content below one-half of one percent.

ANTONI SZAYNA.